UNITED STATES PATENT OFFICE.

PHILIP HELBIG, OF BALTIMORE, MARYLAND.

PROCESS OF HARDENING COPPER.

SPECIFICATION forming part of Letters Patent No. 509,619, dated November 28, 1893.

Application filed September 19, 1893. Serial No. 485,872. (No specimens.)

*To all whom it may concern:*

Be it known that I, PHILIP HELBIG, a citizen of the United States, residing at Baltimore, in the State of Maryland, have invented certain new and useful Improvements in Processes of Hardening Copper, of which the following is a specification.

This invention relates to an improved method of treating copper for the purpose of hardening it, and consists in employing a flux to remove any impurities that may be present, and in combining antimony with the copper thus treated to form an alloy that shall be characterized by the desired hard property.

In carrying out my improved method, the copper is melted in a suitable crucible and certain proportions of glass, subcarbonate of iron, and antimony are added to the copper in the crucible and the entire mass reduced to a molten state, the ingredients being thoroughly incorporated by stirring. This treatment of the copper by the glass and the subcarbonate of iron prepares it for the antimony. After a sufficient time has elapsed to allow the ingredients to operate thoroughly, the molten mass is allowed to settle, the glass and subcarbonate of iron are skimmed or drawn off, leaving the alloy of copper and antimony, which in turn is drawn off and molded into any desired form.

The proportions of the materials used as herein indicated may vary somewhat, but in practice I have found that very good results may be obtained with the following relative amounts: copper, ten parts; glass, six parts; subcarbonate of iron, one part; powdered antimony, one part.

The copper alloy produced by my above-described process possesses the property of hardness to a considerable degree, as it is capable of receiving a knife-edge. In this particular, too, it is distinguished from pure copper, which, as is well known, is comparatively soft and malleable.

Having thus described my invention, what I claim as new, and desire to secure by Letters Patent, is—

The herein described method of treating copper, which consists in melting the copper and in this state treating it with glass and subcarbonate of iron, and finally incorporating antimony with the copper thus treated, substantially as described.

In testimony whereof I affix my signature in the presence of two witnesses.

PHILIP HELBIG.

Witnesses:
   CHAS. B. MANN,
   CHAS. B. MANN, Jr.